(No Model.) 2 Sheets—Sheet 2.
J. COOK.
SAW MILL FEED MECHANISM.
No. 308,063. Patented Nov. 18, 1884.
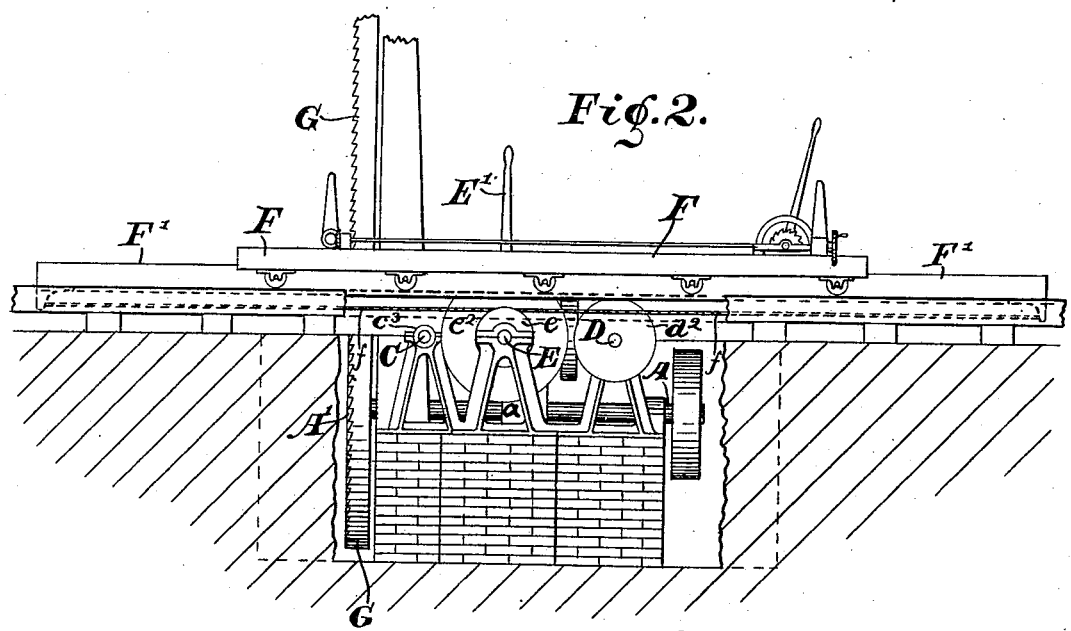
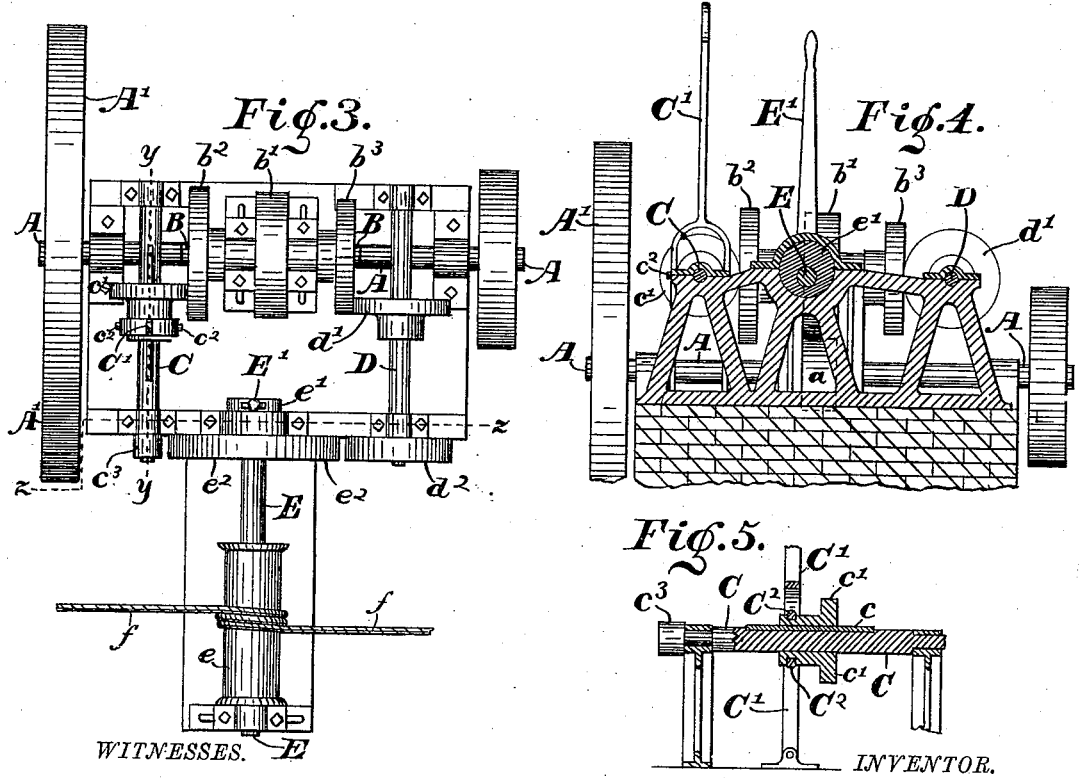
WITNESSES.
Chas. N. Leonard.
E. W. Bradford.
INVENTOR.
Joseph Cook,
PER
C. Bradford,
ATTORNEY.

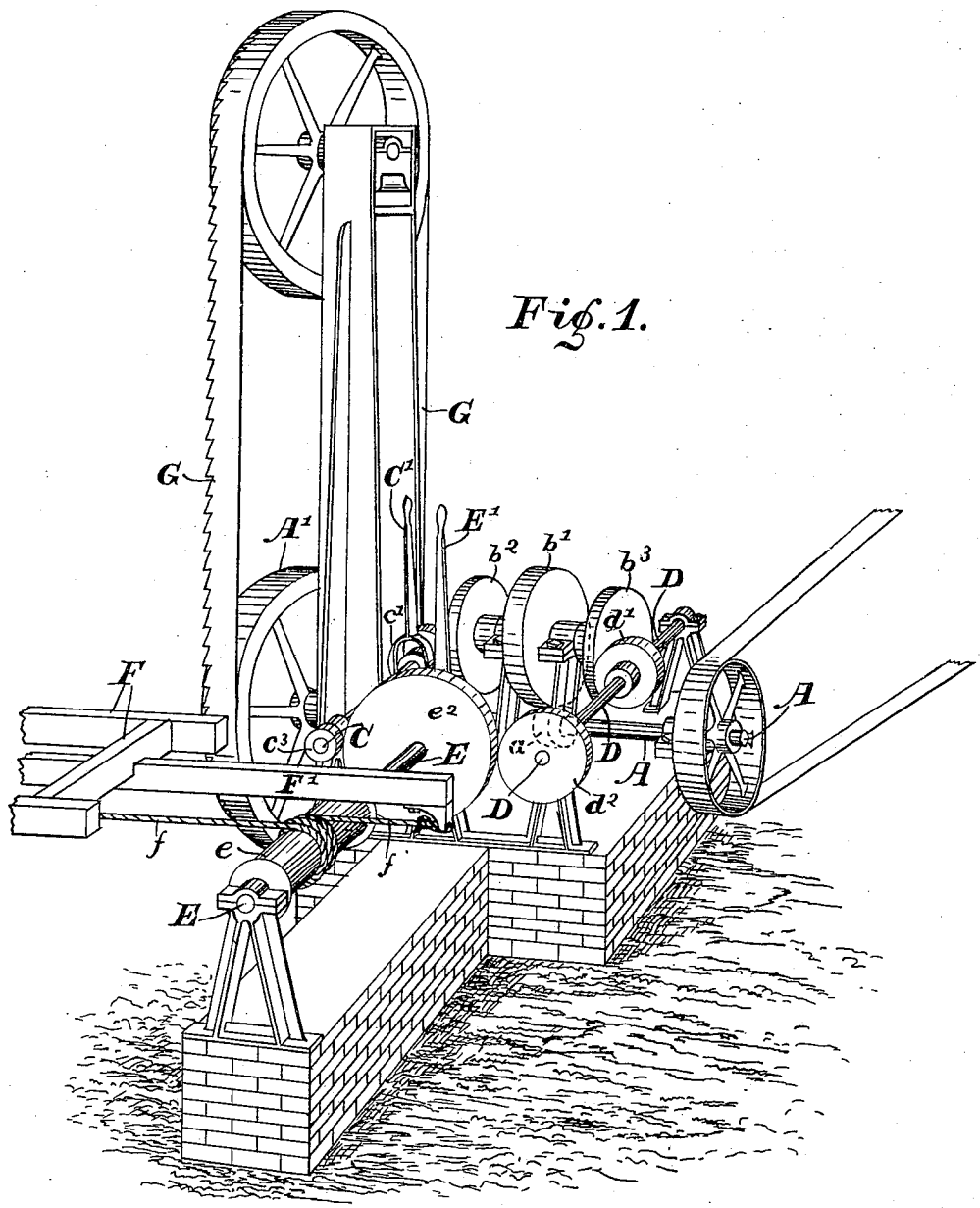

UNITED STATES PATENT OFFICE.

JOSEPH COOK, OF INDIANAPOLIS, INDIANA, ASSIGNOR TO SINKER, DAVIS & COMPANY, OF SAME PLACE.

SAW-MILL FEED MECHANISM.

SPECIFICATION forming part of Letters Patent No. 308,063, dated November 18, 1884.

Application filed September 22, 1884. (No model.)

*To all whom it may concern:*

Be it known that I, JOSEPH COOK, of the city of Indianapolis, county of Marion, and State of Indiana, have invented certain new and useful Improvements in Saw-Mill Feed Mechanism, of which the following is a specification.

The object of my said invention is to produce a feed mechanism for band, circular, and other saw mills which shall be easily operated and shall be efficient and durable. This object is accomplished by the improved construction and arrangement of friction-gearing, &c., as will be hereinafter more particularly described and claimed.

Referring to the accompanying drawings, which are made a part hereof, and on which similar letters of reference indicate similar parts, Figure 1 is a perspective view illustrating my invention; Fig. 2, an elevation of the same; Fig. 3, a top plan of the feed mechanism and adjacent parts; Fig. 4, a vertical sectional view, looking upwardly from the dotted line $z\ z$ in Fig. 3; and Fig. 5, a detail section on the dotted line $y\ y$ in Fig. 3.

In said drawings, the portions marked A represent the main shaft or mandrel of the saw; B, a counter-shaft carrying friction-pulleys; C D, feed-shafts driven by said counter-shaft through the friction-gearing; E, the carriage-shaft connected to the carriage or table; F, said carriage, and G the saw. The shaft or mandrel A is the ordinary main shaft for driving or carrying the saw, and is mounted in suitable bearings secured to the frame-work of the mill. The machine illustrated being a band-saw, a suitable pulley, A', for such a saw is shown as mounted on this shaft, and a friction-pulley, $a$, by which the feed mechanism is driven, is also shown as mounted thereon. The shaft B is mounted in suitable bearings, and carries the several friction-pulleys, $b'\ b^2\ b^3$, through one of which, $b'$, it is driven, and through the others of which, $b^2\ b^3$, and corresponding pulleys, $c'\ d'$, on said shafts, it drives the shafts C D. The shafts C D are set at substantially right angles with the shaft B, preferably in the same horizontal plane, and, through the friction-pulleys $b^2\ c'$ and $b^3\ d'$, are driven thereby. The shaft C has said pulley $c'$ mounted thereon in such a manner as to revolve therewith, but so as to be permitted a longitudinal adjustment thereon, a spline, $c$, being commonly employed, as is usual in such cases. A bifurcated lever, C', is placed astride the shaft, and pivoted to the frame below, with which pins $c^2$ in a trunnioned ring, C², engage. Said ring being in a circumferential groove in the hub of the pulley $c'$, or otherwise connected thereto, said pulley is thus adapted to be adjusted by means of said lever back and forth along the shaft in front of the pulley $b^2$, and the speed of said shaft thus regulated and the motion or "feed" of the carriage thus determined. Upon the outer end of this shaft C is a small friction-pulley, $c^3$, with which the pulley on the carriage-shaft E is adapted to be thrown in contact, and said carriage-shaft thus put in motion. The shaft D carries the friction-pulleys $d'\ d^2$, corresponding to the pulleys $c'\ c^3$ on the shaft C, (but usually varying in size therefrom,) except that the pulley $d'$ is not usually adjustable, being for the purpose of feeding the carriage back, in which operation no change of speed is ordinarily necessary. The shaft E is mounted at the outer end in a bearing on the frame-work, and at the inner end in a cam-block, $e'$, which is in turn mounted in a bearing in the frame-work, and has a lever, E', fixedly secured thereto. Upon the outer end a spool, $e$, is mounted, and upon the inner end a friction-pulley, $e^2$. When it is desired that the carriage shall remain at rest, the lever E' is left in a vertical position, as shown in the drawings, and the pulley $e^2$ is then free from the pulleys $c^3$ and $d^2$. When it is desired to feed the carriage forward, the lever E' is thrown over to the right of the position it occupies in the drawings, which, through the cam $e'$, throws the inner end of the shaft E to the left, bringing the pulley $e^2$ into contact with the pulley $c^3$, thus putting said pulley and shaft in motion and drawing the carriage along in front of the saw, and the logs or lumber thereon into position to be sawed. When it is desired to run the carriage back the lever E' is thrown over to the left, which brings the pulley $e^2$ into contact with the pulley $d^2$, which, in like manner as before, accomplishes the object, as will be readily understood.

The carriage or table F is any ordinary carriage for the purpose, and its form may be varied as desired, or according to the kind of work to be performed. It has usually a bar, F', to which, by means of a rope, $f$, or otherwise, the feed mechanism is connected. Instead of this rope and the spool $e$, the usual rack and pinion may, if desired, be employed, as will be readily understood.

Having thus fully described my said invention, what I claim as new, and desire to secure by Letters Patent, is—

1. The combination, in a feed mechanism, of the main shaft, a counter-shaft driven therefrom having two pulleys, two feed-shafts running at substantially right angles with said counter-shaft and driven by said pulleys, a carriage-shaft located between said feed-shafts, and means of moving said carriage-shaft toward or from either of said feed-shafts, whereby it may be driven by either, through pulleys thereon and on said carriage-shaft, substantially as set forth.

2. The combination of the shaft A, having a wheel or pulley, $a$, the shaft B, having friction-pulleys $b'$ $b^2$ $b^3$, the shaft C, having wheels or pulleys $c'$ $c^3$, the shaft D, having wheels or pulleys $d'$ $d^2$, the shaft E, having a spool or pinion, $e$, and wheel or pulley $e^2$, a lever for throwing said pulley $e^2$ into contact or engagement with one or the other of the pulleys $c^3$ $d^2$, and the table or carriage connected to the spool or pinion $e$, substantially as set forth.

3. The combination, in a saw-mill feed mechanism, of the main shaft, a counter-shaft driven thereby or therefrom, having friction-pulleys $b^2$ and $b^3$, two feed-shafts, C and D, at substantially right angles therewith, having friction-wheels $c'$ $c^3$ and $d'$ $d^2$, said pulleys $c'$ $d'$ engaging with the pulleys $b^2$ $b^3$, and said pulleys $c^3$ $d^2$ being on the other end of the shafts on either side of the carriage-shaft, which is driven thereby, and a lever, C', connected to the pulley $c'$, which is movably mounted on one of said feed-shafts, whereby said pulley may be moved back and forth in front of the corresponding pulley on the counter-shaft, and the speed of the feed-shaft thus varied, substantially as set forth.

4. The combination, in a feed mechanism, of the main shaft, a counter-shaft driven therefrom, two feed-shafts mounted at substantially right angles with said counter-shaft, and driven therefrom by gearing, a carriage-shaft mounted between said feed-shafts, and means for throwing said carriage-shaft either into or out of engagement with either of said feed-shafts, whereby it may be driven from either through gear mounted thereon, substantially as set forth.

In witness whereof I have hereunto set my hand and seal, at Indianapolis, Indiana, this 15th day of September, A. D. 1884.

JOSEPH COOK. [L. S.]

In presence of—
E. W. BRADFORD,
C. BRADFORD.